W. H. CAIN.
GAS BURNER.
APPLICATION FILED MAR. 14, 1918.

1,279,250.

Patented Sept. 17, 1918.

Inventor:
William H. Cain.
by Hazard & Miller
Att'ys.

UNITED STATES PATENT OFFICE.

WILLIAM H. CAIN, OF LOS ANGELES, CALIFORNIA.

GAS-BURNER.

1,279,250.   Specification of Letters Patent.   Patented Sept. 17, 1918.

Application filed March 14, 1918. Serial No. 222,480.

*To all whom it may concern:*

Be it known that I, WILLIAM H. CAIN, a citizen of the United States, residing at Los Angeles, in the county of Los Angeles and State of California, have invented new and useful Improvements in Gas-Burners, of which the following is a specification.

My object is to make a gas burner which will produce perfect combustion and reduce the amount of gas required for a certain result, and my invention consists in the novel features herein shown, described and claimed.

Figure 1:
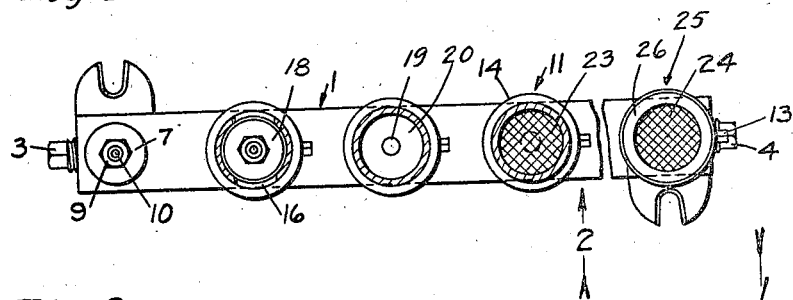
Figure 1 is a top plan view of a burner embodying the principles of my invention, parts being shown in section.
Figure 2:
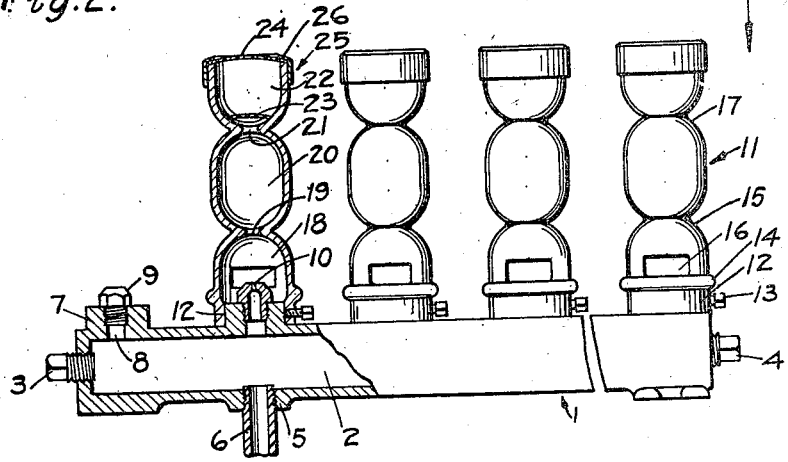
Fig. 2 is a side elevation looking in the direction indicated by the arrow 2 in Fig. 1, parts being shown in section.

The burner base 1 is square in cross-section and of any desired length, said base being a casting cored to form a chamber 2, the openings at the ends formed by the core prints being screw-threaded and closed by plugs 3 and 4. A boss 5 is formed upon the bottom of the base 1 and the gas supply pipe 6 is tapped through this boss into the chamber 2.

Circular nipples 7 extend upwardly from the base 1, each nipple having a central vertical bore 8 leading from the chamber 2. The orifice spuds 9 are tapped into the bores 8 and each spud has a central orifice 10. The nipples 7 are machined upon their peripheries, preferably straight up and down and circular in plan, and the mixing tubes 11 are mounted upon these nipples 7.

Each mixing tube 11 comprises a circular band 12 internally machined to fit a nipple 7 and having a set-screw 13 to hold the band upon the nipple, a bead 14 at the upper end of the band 12, a mixing chamber wall 15 extending upwardly from the bead 14 and having air inlet openings 16 at opposite sides in its lower end on a level with the orifice 10, and a second mixing chamber wall 17 extending upwardly from the mixing chamber wall 15.

The parts 12, 14, 15 and 17 are all cast integral and form an intake mixing chamber 18 in the lower end of the mixing chamber wall 15, a throat 19 leading upwardly from the chamber 18, a secondary mixing chamber 20 above the throat 19, a second throat 21 extending upwardly from the second mixing chamber 20, and a distributing chamber 22 above the throat 21.

A mixing screen 23 is inserted downwardly into the distributing chamber 22 above the throat 21, and the burner screen 24 is placed against the upper end of the casting and held in place by an annular band 25 having an inturned flange 26 overlapping the edge of the screen.

The use of the double expansion mixing chamber insures a perfect mixture of the gas and air, thereby producing perfect combustion and reducing the amount of gas required for a given heat, and the double expansion mixing chambers connected by small throats and topped by a mixing screen prevent or reduce the liability of burning back, thus making it possible to make the mixing chambers larger in diameter in proportion to the gas consumed than they could be made in a straight form.

Various changes may be made in the details of construction without departing from the spirit of my invention as claimed.

I claim:

1. A gas burner comprising a chambered base, a circular nipple extending up from the base and having a central bore, an orifice spud in the central bore, and a mixing tube comprising a circular band fitting loosely upon the nipple, a set-screw through the band to engage the nipple, a mixing chamber extending upwardly from the band and having air inlet openings at opposite sides, a second mixing chamber extending upwardly from the first mixing chamber, and a distributing chamber extending upwardly from the second mixing chamber; there being a small throat connecting the first mixing chamber to the second mixing chamber and a second small throat connecting the second mixing chamber to the distributing chamber.

2. A gas burner comprising a cast burner base rectangular in cross-section and cored to form a chamber; there being an opening to receive a gas supply pipe; a plurality of circular nipples extending upwardly from the base in a line; each nipple having a central vertical bore leading from the chamber; orifice spuds tapped into the vertical bores; said nipples being machined upon their peripheries; and mixing tubes mounted upon the nipples; each mixing tube comprising a circular band fitting loosely upon a nipple, a set-screw through the band to engage the nipple, a mixing chamber extending upwardly from the band and having air inlet openings at opposite sides, a second mixing chamber extending upwardly from the first mixing chamber, and a distributing chamber extending upwardly from the second mixing chamber; there being a small throat connecting the first mixing chamber to the second mixing chamber and a second small throat connecting the second mixing chamber to the distributing chamber.

In testimony whereof I have signed my name to this specification.

WILLIAM H. CAIN.